July 10, 1962     A. J. COLAUTTI     3,043,552
POWER TRANSMITTING MECHANISM FOR VEHICLE SEATS
Filed March 3, 1960     2 Sheets-Sheet 1

INVENTOR.
Albert J. Colautti
BY
Hugh L. Fisher
ATTORNEY

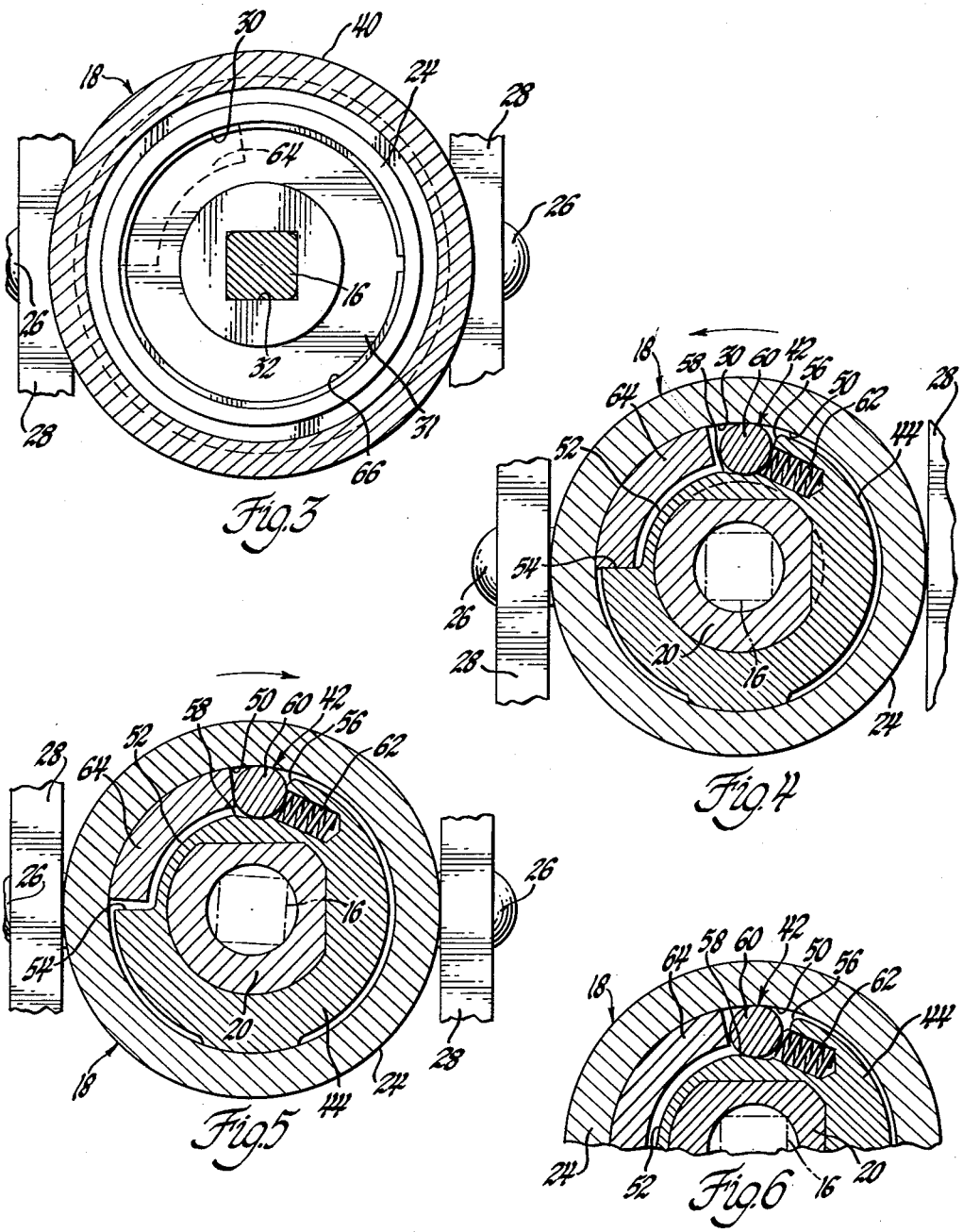

[Patent No.] 3,043,552
Patented July 10, 1962

3,043,552
POWER TRANSMITTING MECHANISM FOR VEHICLE SEATS
Albert J. Colautti, Windsor, Ontario, Canada, assignor to General Motors Corporation, Detroit, Mich., a corporation of Delaware
Filed Mar. 3, 1960, Ser. No. 12,638
10 Claims. (Cl. 248—429)

This invention relates generally to power transmitting mechanisms and particularly to improvements in power transmitting mechanisms of a character adapted for use, although not exclusively, with power actuated vehicle seat adjusters.

When power is utilized to alter vehicle seat positions, so-called "creep" becomes a concern. The reason for this is that the normal drive train utilized permits back drive thereof due to the external forces applied to the seat, e.g., the push on the seat resulting when the driver applies the brakes, the tendency for the seat to be pushed forwardly by the rear seat occupants, and the inertia force urging the seat forwardly particularly during panic stops. Although the amount of creep occurring each time an external force is applied may be slight, an accumulation can produce a definite change in seat position such that the driver is required to make a readjustment. Also, it must be kept in mind that usually the creep tendency is greater in one direction than another due to the fact that the external force inducing this is generally greater.

With these problems in mind the invention contemplates a novel provision for preventing unwanted seat creep. Specifically, the invention affords a unique drive arrangement in which that drive tending to produce creep is effectively resisted without resort to complex and costly structures. Additionally, the invention affords a more positive arrangement for resisting creep in one direction than another so as to provide for the greater creep tendency in the one direction.

Another important object of the invention is to furnish a power transmitting mechanism that is adapted to resist back drive in either direction while allowing forward drive to occur in either direction without interference. Also, unique provision is made for resisting back drive in a direction induced by the greatest external forces. More specifically, the invention utilizes in conjunction with the power transmitting mechanism a one-way device so associated with cooperating structures as to allow forward drive in either direction, whereas back drive in one direction only is resisted thereby.

The foregoing and other objects and advantages of the invention will be apparent from the following description and from the accompanying drawings in which:

FIGURE 3 is a sectional view of the power transmitting mechanism taken along line 3—3 of FIGURE 2;

FIGURE 4 is a sectional view taken along line 4—4 of FIGURE 2 depicting the power transmitting mechanism in one operating position thereof;

FIGURE 5 is a sectional view of the power transmitting mechanism similar to FIGURE 4 showing another operating position thereof; and FIGURE 6 is a fragmentary sectional view showing, similar to FIGURE 4, still another operating position thereof.

Figure 1:
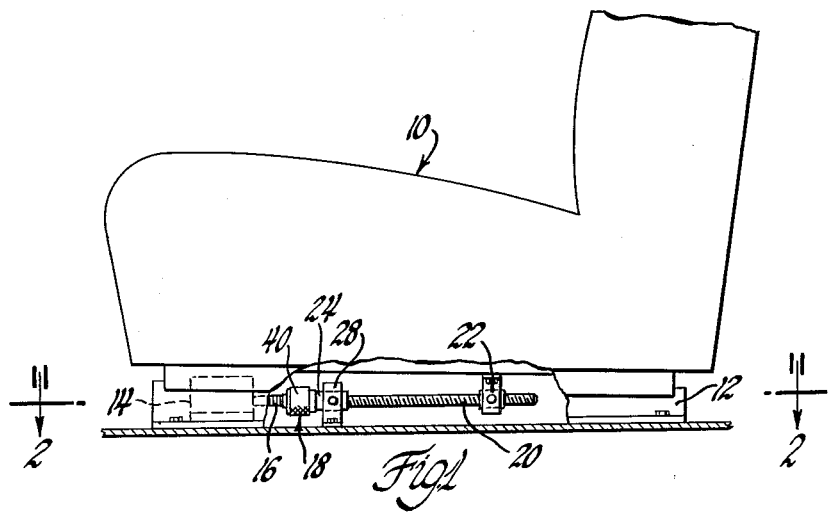
FIGURE 1 depicts a seat adjustment arrangement incorporating the principles of the invention.

Referring to the drawings in detail and particularly to FIGURE 1, the numeral 10 designates generally a seat shown mounted on guide tracks 12. A motor 14 is drive connected to an input motor shaft 16, and through a power transmitting mechanism 18 to an output screw shaft 20, which in turn is drive connected to a swivel nut 22 joined to the seat 10. As will become apparent, rotation of the motor 14 in a selected direction will cause the screw shaft 20 to be revolved in the corresponding direction and cause either fore or aft adjustment of the position of the seat 10.

The power transmitting mechanism 18 includes as a part of the structure thereof an elongated sleeve 24 that through a swivel connection 26 is swingably mounted on a floor support 28. The swivel connection 26 permits the rotation of the sleeve 24 about the axis formed by the swivel connection 26, but axial shifting and rotary movement about the rotational axis thereof is prevented. In one end of the sleeve 24 a bore 30 is provided for revolvably supporting a drive transfer member 31, which has at 32 a socket connection with the end of the motor shaft 16. Another bore 33 in the sleeve 24 supports through an elongated bearing 34, the end of screw shaft 20. Leftward thrust of the screw shaft 20 is resisted by an efficient ball type thrust bearing 36 interposed between the face of the sleeve 24 and a shoulder 38 on the screw shaft 20. In the usual manner, the balls of the thrust bearing 36 assume the leftward thrust and provide a relatively frictionless fit between the shoulder 38 and adjacent surface on the sleeve 24 so as to offer a minimum resistance to the screw shaft rotation. On the opposite side from the thrust bearing 36, a cover 40 is threadedly joined to the sleeve 24 so as to afford a dust-free enclosure for the power transmitting mechanism 18.

Also stationed within the sleeve bore 30 is a one-way device denoted generally at 42 comprising an inner race 44 drive connected to and axially positioned on the end of the screw shaft 20 between a shoulder 46 formed between the two bores 30 and 33 in the sleeve 24 and a snap ring 48. The bore 30 in the vicinity of the inner race 44 functions as an outer race for the one-way device 42 and is denoted generally at 50. The inner race 44, as can be best seen in FIGURE 4, has a relieved portion 52, the ends of which provide abutment surfaces 54 and 56. The relieved portion 52 includes an inclined ramp or cam surface 58 on which a locking element as roller 60 is mounted. The roller 60 is urged to the locking position relative to the cam surface 58 and the surface of the outer race 50 by an energizing spring 62, the function of which is to maintain the roller 60 in preparedness for ready movement to the locking position in a way well-known by those versed in the art. The directions of locking and releasing action for the one-way device 42 will be described later.

The drive transfer member 31 has a drive arm 64 that extends between the roller 60 and the abutment surface 54, this being best shown in FIGURES 4, 5, and 6. The relative positions of the drive transfer member 31 and the one-way device 42 relative to the sleeve bore 30 are maintained by a snap ring 66 joined to the sleeve 24.

Considering the operation, it will initially be assumed that forward drive is desired, this being the drive required to maneuver the seat 10 to different positions. If the motor 14 in initiating the forward drive causes, as viewed in FIGURE 4, the drive transfer member arm 64 to be revolved counterclockwise, the drive arm 64 will engage the inner race shoulder 54 and cause the inner race 44 to revolve the screw shaft 20 in the corresponding direction. If the screw shaft 20 has the demonstrated right hand threads, the swivel nut 22 and accordingly the seat 10 will be moved rearwardly or to the right as viewed in FIGURE 1. If the motor 14 is still to produce a forward drive but now revolves drive arm 64 clockwise, as seen in FIGURE 5, the drive arm 64 will engage the roller 60 and force the roller to the released position against the shoulder 56. The energizing spring 62 will be compressed but not to such an extent as to produce damage thereto. Consequently, drive is through the roller 60 and from the inner race 44 to the screw shaft 20. Of course, this clockwise rotation of the screw shaft 20 will cause the seat 10 to move in the opposite direction or forward, again as depicted in FIGURE 1.

Figure 2:
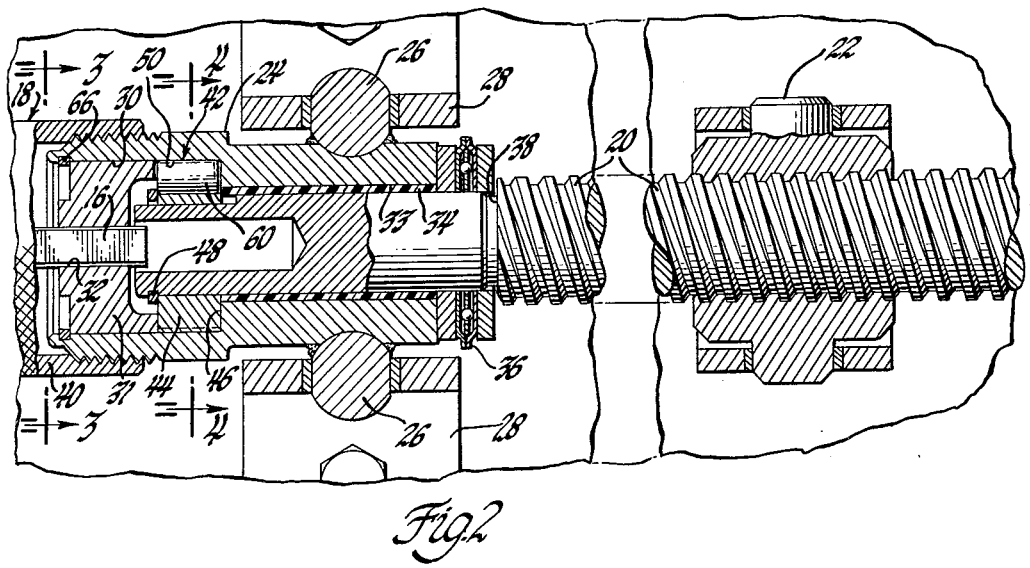
FIGURE 2 is a sectional view taken along line 2—2 of FIGURE 1 showing a power transmitting mechanism for adjusting the seat.

Back drive, now to be explained, occurs when an external force is applied to the seat 10 such that the nut 22 tends to rotate the shaft 20 in a direction determined by whether the force applied to the seat 10 tends to push it backwardly or forwardly from the FIGURE 1 position. Assuming first that a pushing force is applied to the seat 10 urging it backwards, this force will cause the screw shaft 20 to rotate clockwise, as viewed in FIGURES 4, 5, and 6. As a result, the right hand threads on the screw shaft 20 will cause thrust to be to the left as observed in FIGURE 2, which leftward thrust will be resisted by the efficient thrust bearing 36. Also, as seen in FIGURE 6, clockwise rotation of the screw shaft 20 causes the roller 60 to move up the cam surface 58 and to the locking position, thereby preventing relative rotation between the screw shaft 20 and the stationary sleeve 24. On the other hand, if the forces applied to the seat 10 urge it forwardly, the tendency will be for the screw shaft 20 to revolve counterclockwise, the one-way device 42 will unlock and thrust will occur to the right. This rightward thrust urges the side of the inner race 44 against the shoulder 46 and the frictional engagement therebetween functions somewhat as an inefficient thrust washer braking the screw shaft 20 against counterclockwise rotation; hence, the seat 10 will be locked against the forces inducing a counterclockwise back drive.

From the foregoing, it can be seen that the power transmitting mechanism 18 permits forward drive in either direction, drive in one direction being through the one-way device 42 with the one-way device 42 being deactivated or maintained released. As for back drive, that induced by the greatest forces is resisted by the one-way device 42, whereas that produced by lesser forces and in an opposite direction is resisted by the brake action from an inefficient thrust relationship. As a consequence, pushing forces from the driver will not cause creep of the seat 10 nor will those movements tending to maneuver the seat forwardly be of any concern.

The invention is to be limited only by the following claims:

1. In combination, input and output members, a releasable one-way device, drive transfer means coacting with the one-way device so that drive from the input member in opposite directions thereof to the output member is respectively through and around the one-way device, and brake means, the brake means and the one-way device being so arranged that the brake means only prevents rotation of the output member in one direction of drive from the output member and the one-way device only prevents rotation of the output member in the opposite direction.

2. In combination, rotatable input and output members, a releasable one-way device, drive transfer means coacting with the one-way device when drive from the input member is in one direction so as to cause drive to by-pass the one-way device thereby transferring drive directly to the output member and when drive from the input member is in an opposite direction so as to initially release the one-way device and thereafter transfer drive therethrough to the output member, the one-way device being so arranged as to prevent rotation of the output member only when drive is from the output member in one direction, and brake means preventing rotation of the output member only when drive is from the output member in an opposite direction.

3. In combination, a power driven input member, an output member, a releasable one-way device comprising an inner race drive connected to the output member, a stationary outer race, and a locking element frictionally interposed between the inner and outer races so as to prevent relative rotation between the races in one direction, complementary braking surfaces formed on each of the inner and outer races, and drive transfer means operative when drive is from the input member in one direction to by-pass the one-way device thereby driving directly the inner race and the output member in said one direction and when drive from the input member is in an opposite direction to initially release the one-way device and thereafter transfer drive through the locking element to the inner race and the output shaft in said opposite direction, the one-way device preventing rotation of the output member in relation to the stationary outer race only when the output member is attempting to drive in one direction, the output member being so arranged as to engage the inner and outer braking surfaces only when the output member is attempting to drive in an opposite direction.

4. In combination, rotatable input and output members, a releasable one-way device comprising an inner race drive connected to the output member, a stationary outer race, and a locking element frictionally interposed between the inner and outer races so as to prevent relative rotation between the races in one direction, drive transfer means operative when the drive from the input member is in one direction to by-pass the one-way device thereby driving directly the inner race and the output member in said one direction and when drive from the input member is in an opposite direction to initially release the one-way device and thereafter transfer drive through the locking element and to the inner race and the output member in said opposite direction, the one-way device preventing rotation of the output member relative to the outer race only when the output member is attempting to drive in one direction, and brake means preventing rotation of the output member in an opposite direction, the brake means being so arranged as to be only engaged by attempted rotation of the output member in an opposite direction.

5. In combination, rotatable input and output members, a releasable one-way brake comprising an inner race drive connected to the output member, a stationary outer race, and a locking element frictionally interposed between the inner and outer races so as to prevent relative rotation between the races in one direction, complementary braking surfaces formed on each of the inner and outer races, and drive transfer means operative when drive from the input member is in one direction to by-pass the one-way device thereby transferring drive directly through the inner race and to the output member and when drive from the input member is in an opposite direction to release the locking element so as to cause drive to be transferred through the locking element and to the inner race and to the output member thereby causing the inner race and the output member to be revolved in said opposite direction, the one-way brake alone preventing rotation of the output member relative to the outer race when the output member is attempting to drive in one direction, the output member being so arranged as to engage the braking surfaces on the inner and outer races of the one-way brake so as to resist rotation of the output member only when the output member is driving in an opposite direction.

6. In combination; a power driven input member provided with a drive lug thereon; an output screw shaft; and a one-way brake comprising an inner race drive connected to the screw shaft and including spaced abutment surfaces and a braking surface, a stationary outer race having a braking surface adjacent the inner race braking surface and a locking element frictionally interposed between the inner and outer races so as to prevent relative rotation between the races, the drive lug being interposed between the locking element and one of the abutment surfaces so as to engage said one of the abutment surfaces when drive from the input member is in one direction and to urge the locking element to the released position thereof and against the other of the abutment surfaces when drive from the input member is in another direction thereby causing the inner race and the screw shaft to be revolved therewith and in a corresponding direction; the output shaft being prevented from rotation in one direction relative to the outer race by the one-way brake when the output shaft is attempting to drive in said one direction and from rotation in an opposite direction relative to the outer race by the frictional engagement between the inner and outer race braking surfaces caused by the thrust acting on the output shaft when the output shaft is attempting to drive in said opposite direction.

7. In combination; a power driven input member provided with a drive lug thereon; an output screw shaft; a stationary sleeve revolvably supporting the input member and the output screw shaft and having a braking surface thereon; and a one-way brake comprising an inner race drive connected to the screw shaft and including spaced abutment surfaces, a cam surface therebetween, and a side braking surface adjacent the sleeve shoulder, an outer race formed integral with the stationary sleeve, and a locking roller frictionally interposed between the inner race cam surface and the outer race so as to prevent relative rotation between the races in one direction; the drive lug being interposed between the roller and one of the abutment surfaces so as to engage said one of the abutment surfaces when drive from the input member is in one direction and to urge the roller to the released position thereof and against the other of the abutment surfaces when drive from the input member is in another direction thereby causing the inner race and the screw shaft to be revolved therewith and in a corresponding direction; the output shaft being prevented from rotation in one direction relative to the stationary sleeve by the one-way brake when the output shaft is attempting to drive in said one direction and from rotation in an opposite direction relative to the stationary sleeve by frictional braking engagement between the sleeve and the inner race braking surfaces caused by the thrust acting on the output shaft when the output shaft is attempting to drive in said opposite direction.

8. In a vehicle seat adjuster; the combination of a motor driven input member provided with a drive lug thereon; an output screw shaft arranged so as to maneuver the seat in opposite directions; and a releasable one-way brake comprising an inner race drive connected to the screw shaft and including spaced abutment surfaces and a braking surface, a stationary outer race having a braking surface, and a locking element frictionally interposed between the inner and outer races so as to prevent relative rotation between the races; the drive lug being interposed between the locking element and one of the abutment surfaces so as to engage said one of the abutment surfaces when drive from the input member is in one direction and to urge the locking element to the released position thereof and against the other of the abutment surfaces when drive from the input member is in another direction thereby causing the inner race and the screw shaft to be revolved therewith and in a corresponding direction; the output shaft being prevented from rotation in one direction relative to the outer race when the output shaft is attempting to drive in said one direction and from rotation in an opposite direction relative to the outer race by frictional engagement between the inner and outer braking surfaces caused by the thrust acting on the output shaft when the output shaft is attempting drive in said opposite direction thereby resisting movement of the seat in either direction.

9. In a vehicle seat adjuster; the combination of a power motor driven input member, an output member arranged so as to maneuver the seat in opposite directions, a releasable one-way device comprising an inner race drive connected to the output member, a stationary outer race, and a locking element frictionally interposed between the inner and outer races so as to prevent relative rotation between the races in one direction, drive transfer means operative when the drive from the input member is in one direction to by-pass the one-way device thereby driving directly the inner race and the output member in said one direction and when drive from the input member is in an opposite direction to initially release the locking element and thereafter transfer drive therethrough to the inner race and the output member in said opposite direction, the one-way device preventing rotation of the output member relative to the outer race when the seat is urged in one direction, and brake means preventing rotation of the output member when the seat is urged in an opposite direction.

10. In a vehicle seat adjuster, the combination of a motor driven input member, an output member so arranged as to maneuver the seat in opposite directions, a releasable one-way device interposed between the input and output members, drive transfer means coacting with the one-way device when drive from the input member is in one direction so as to cause drive to be by-passed thereby transferring drive directly to the output member and when drive from the input member is in an opposite direction so as to initially release the one-way device and thereafter transfer drive therethrough to an output member, the one-way device being so arranged as to prevent rotation of the output member when the seat is urged in one direction, and brake means preventing rotation of the output member when the seat is urged in an opposite direction.

References Cited in the file of this patent

UNITED STATES PATENTS

| | | |
|---|---|---|
| 1,858,065 | Verderber | May 10, 1932 |
| 2,588,165 | Rossmann | Mar. 4, 1952 |
| 2,597,798 | Houplain | May 20, 1952 |